UNITED STATES PATENT OFFICE 2,384,607

DERIVATIVES OF 5-AMINO-1,3-DIOXANES AND METHOD OF MAKING SAME

Melvin De Groote, University City, Mo., assignor to Petrolite Corporation, Ltd., Wilmington, Del., a corporation of Delaware No Drawing. Original application December 10, 1943, Serial No. 513,781. Divided and this application July 26, 1944, Serial No. 546,746

9 Claims. (Cl. 260—338)

This invention relates to a new chemical product or compound and to the manufacture of same, my present application being a division of my pending application Serial No. 513,781, filed December 10, 1943. This application is now Patent No. 2,375,536, issued May 8, 1945.

One object of my invention is to provide a new chemical product or compound, that is particularly adapted for use as a demulsifier for crude oil emulsions, but which is also capable of various other uses.

Another object of my invention is to provide a practicable method for manufacturing said new chemical product or compound.

Demulsification, as contemplated in the present application, includes the preventive step of commingling the demulsifier with an aqueous component, which would or might subsequently become either phase of the emulsion, in absence of such precautionary measure.

Although one of the primary objects of my invention is to provide a new compound or composition of matter, that is an efficient demulsifier for crude oil emulsions of the water-in-oil type, said new compound or composition of matter has other uses, as hereinafter explained.

The compounds herein contemplated as such, and particularly as demulsifiers, consist of hereinafter described acylated and oxyalkylated derivatives of 5-amino-1,3-dioxanes having the structural formula:

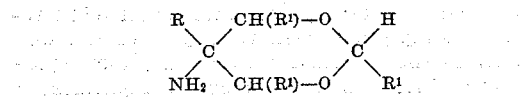

where R is a member of the class consisting of hydrogen, alkyl, and alpha-hydroxyalkyl, $R^1$ is a member of the class consisting of hydrogen, alkyl, aryl, and furyl. Chemical products or compounds of the kind above referred to are obtained by acylation and oxyalkylation. The acyl group can be introduced as part of an amido radical, or as part of an ester radical, and is obtained from a monocarboxy acid or equivalent having an acyl radical containing an unbroken chain of at least 8 carbon atoms. In other words, such acyl radical may appear as an amido radical, or as an acyloxy radical. For example, an aminodioxane of the type previously described may be reacted with a higher fatty acid so as to form an amide. The amide so obtained may be subjected to oxyalkylation, particularly oxyethylation. Similarly, the amide may be subjected to oxyalkylation first, and then to acylation afterwards. Obviously, one can also prepare a type of compound having more than one high molal acyl radical present, and for that matter, one of such acyl radicals may be present in the ester form and the other in the amido form.

As to the manufacture of aminodioxanes which are one class of the reactants employed in the manufacture of the herein contemplated new compositions of matter, reference is made to U. S. Patent No. 2,247,256, dated June 24, 1941, to Senkus, and to U. S. Patent No. 2,317,555, dated April 27, 1943, to Robinette. It is a matter of common knowledge that aminodioxanes are made by condensing a nitroglycol with an aldehyde and reducing the condensation product. The synthesis of such compounds is demonstrated by the following reactions:

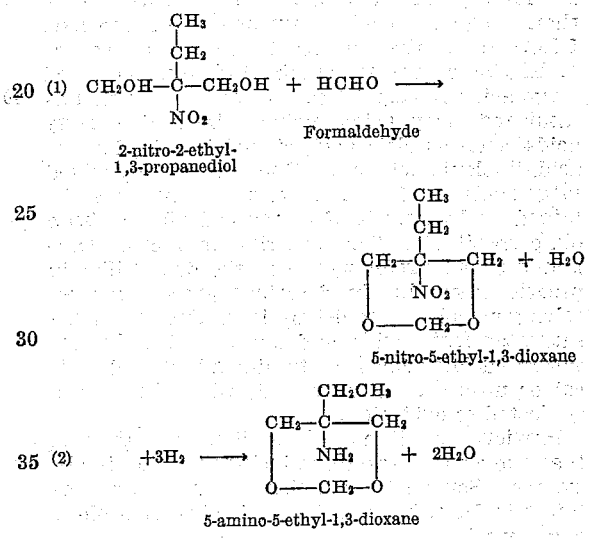

It is well known that certain monocarboxy organic acids containing an unbroken chain of eight carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula $R^2COOH$. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

In addition to synthetic carboxy acids obtained by the oxidation of paraffins or the like, there is the somewhat analogous class obtained by treating carbon dioxide or carbon monoxide in the presence of hydrogen or an olefine with steam, or by causing a metallic alkoxide or a halogenated hydrocarbon to react with chloroacetic acid, or with potassium cyanide, and saponifying the product obtained. Such products or mixtures thereof, having at least 8 and not more than 32 carbon atoms and having at least one carboxy group or the equivalent thereof, are as suitable for use as the conventional detergent-forming monocarboxy acids, and another analogous class equally suitable, is the mixture of carboxylic acids obtained by the alkali treatment of alcohols of high molecular weight formed in the catalytic hydrogenation of carbon monoxide.

Although any of the high molal monocarboxy acids can be converted into esters, amides or esteramides of the kind described, by conventional procedure, it is my preference to employ compounds derived from higher fatty acids, rather than petroleum acids, rosin acids, and the like. I have found that by far the most effective demulsifying agents are obtained from unsaturated fatty acids having 18 carbon atoms. Such unsaturated fatty acids include the higher fatty acids, such as oleic acid, ricinoleic acid, linoleic acid, linolenic acid, etc. One may employ mixed fatty acids, as, for example, the fatty acids obtained by hydrolysis of cottonseed oil, soyabean oil, corn oil, etc. The material, product or compound that I prefer to use as the demulsifier in practising my herein described process for resolving petroleum emulsions, is obtained from unsaturated fatty acids, and more specifically, unsaturated fatty acids, containing a hydroxyl radical or unsaturated fatty acids which have been subjected to oxidation.

Previous attention has been directed to the fact that one class of reactants included the aminodioxanes. Some of the aminodioxanes may contain a hydroxy hydrocarbon radical susceptible to oxyalkylation.

As examples of the 5-amino-1,3-dioxanes which may be included are the 2-phenyl-5-amino-1,3-dioxanes, the 2-(3-heptyl)-5-amino-1,3-dioxanes, and the 2-propyl-5-amino-1,3-dioxanes, which have the following structural formulas:

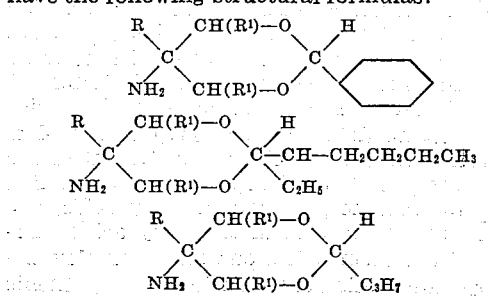

wherein R may represent hydrogen, alkyl, or alpha-hydroxy-alkyl, and $R^1$ may be either hydrogen, alkyl, aryl, or furyl.

As to aminodioxanes containing a hydroxyalkyl group, and particularly a hydroxymethyl group, reference is made to the substituted 1,3-dioxanes, which may be represented by the following formula:

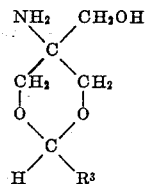

wherein $R^3$ represents an alkyl group, and particularly one having at least five carbon atoms.

As specific examples of the substituted 1,3-dioxanes which are included by the above generic formula, there may be mentioned 5-amino-2-(3-pentyl)-5-hydroxymethyl-1,3-dioxane, 5-amino-2-hexyl-5-hydroxymethyl-1,3-dioxane, 5-amino-2-(3-heptyl)-5-hydroxymethyl-1,3-dioxane, 5-amino-2-hendecyl-5-hydroxymethyl-1,3-dioxane, 5-amino-2-octyl-5-hydroxymethyl-1,3-dioxane, and the like.

As specific examples of the preferred reagents, the following are included:

5-amino-2-(3-amyl)-5-hydroxymethyl-1,3-dioxane
5-amino-2-hexyl-5-hydroxymethyl-1,3-dioxane
5-amino-2-(3-heptyl)-5-hydroxymethyl-1,3-dioxane
2-propyl-5-hydroxy-methyl-5-amino-1,3-dioxane
2-propyl-5-methyl-5-amino-1,3-dioxane
2-(3-heptyl)-5-methyl-5-amino-1,3-dioxane
2-phenyl-5-methyl-5-amino-1,3-dioxane
5-ethyl-5-amino-1,3-dioxane.

The oxyalkylation of compounds having a labile hydrogen atom is a well known procedure. For instance, the procedure of subjecting amines, amides, phenols, or alcohols to the action of an oxyalkylating agent, so as to introduce a repetitious ether linkage between the oxygen atom or nitrogen atom and the labile hydrogen atom is well known. In view of what is said hereinafter, it is obvious that the oxyalkylation of the 5-amino-1,3-dioxanes, or the amide derived therefrom, is simply a subgeneric aspect of the well known methods which contemplate oxyalkylation of amines, amides and alcohols, regardless of source or chemical structure.

Oxyalkylating agents are those containing a reactive ethylene oxide ring. As typical examples of applicable compounds may be mentioned epichlorhydrin, glycid alcohol, ethylene oxide, propylene oxide, butene-2-oxide, butene-1-oxide, isobutylene oxide, butadiene oxide, butadiene dioxide, chloroprene oxide, isoprene oxide, decene oxide, styrene oxide, cyclohexylene oxide, cyclopentene oxide, etc. I particularly prefer to employ oxyalkylating agents having 2 and not more than 4 carbon atoms, such as ethylene oxide, propylene oxide, butylene oxide, glycid and methylglycid. My particularly preferred oxyalkylating agent is ethylene oxide.

Other halogenated epoxides which are the functional equivalents of epichlorhydrin are described in U. S. Patent No. 2,321,037, dated June 8, 1943, to Marple & Evans.

For the sake of brevity, subsequent examples are concerned largely with derivatives in which the high molal acyl radical is derived from higher fatty acids. Attention is directed to the prior description of other equally suitable high molal acids.

AMIDE
Example 1

1 pound mole of 2-propyl-5-hydroxy-methyl-5-amino-1,3-dioxane is reacted with 1 pound mole of ricinoleic acid, or a suitable equivalent, such as 1 pound mole of ethyl ricinoleate or one-third pound mole of triricinolein, so as to produce the corresponding amide. The reaction between the amide and the acid is conducted in the conventional manner. The two reactants are mixed together at a temperature above the boiling point of water, which expedites the removal of water of reaction. The elimination of water is hastened by constant stirring during the period of reaction. Reaction takes place at comparatively low temperatures, for instance, 130–145° C., and is expedited at high temperatures, for instance, 160–180° C. In absence of pyrolysis, and especially when a glyceride is heated in absence of a solvent, one can use a temperature as high as 220° C. to 240° C., and speed up the reaction and increase the yield of amide. In any event, the temperature employed for amidification must be below the pyrolytic point of the reactants. The passage of a dried inert gas through the reaction mass during amidification, hastens the reaction, and also tends to decrease any unreacted material. The completion of the reaction can be determined in any convenient manner, such as a titration test to determine elimination, or substantial reduction, in the amount of basic amine present.

Reaction is generally complete within three hours, if higher temperatures are used, and even under conditions which cause the reaction to take place more slowly, reaction time need never exceed 10–20 hours. The use of some other equivalent rather than a fatty acid, involves conventional changes in the amidification procedure. For instance, the use of an ethyl ester results in the evolution or elimination of ethyl alcohol instead of water. Similarly, ricinoleoamide may be employed as an acylating agent with the evolution of ammonia. All such procedures are comparable with that employed for the acylation of somewhat similar cyclic amines having homocyclic radicals, for instance, cyclohexylamine, benzylamine, aniline, etc. Sometimes amidification is conveniently conducted in the presence of an inert solvent, for instance, xylene, which is permitted to distil off during the reaction and assists in the elimination of water. Xylene and water vapors are condensed, separated, and the xylene returned to the reaction chamber for reuse. Such inert solvent must be immiscible with the vapors being removed, for instance, water, and must be miscible with both reactants. Furthermore, it must be readily volatilized at a temperature below the pyrolytic point of the reactants. Such use is conventional in connection with esterification hereinafter referred to. Any procedure employed must guard against loss of amine during amidfication, or else an excess of the amine must be employed and subsequently must be recovered. If a glyceride is used, and in many ways this is the most desirable procedure, one must remove the glycerol formed by a salt water wash or the like.

AMIDE
Example 2

1 pound mole of 2-propyl-5-methyl-5-amino-1,3-dioxane is substituted for 1 pound mole of 2-propyl-5-hydroxy-methyl-5-amino-1,3-dioxane in the preceding Example 1.

AMIDE
Example 3

The same procedure is followed as in preceding examples, except that the raw material employed is 2-(3-heptyl)-5-methyl-5-amino-1,3-dioxane.

AMIDE
Example 4

The same procedure is followed as in preceding examples, except that the raw material employed is 2-phenyl-5-methyl-5-amino-1,3-dioxane.

AMIDE
Example 5

The same procedure is followed as in preceding examples, except that the raw material employed is 5-ethyl-5-amino-1,3-dioxane.

AMIDE
Example 6

The same procedure is followed as in preceding example, except that the raw material employed is 5-amino-2-(3-amyl)-5-hydroxymethyl-1,3-dioxane.

AMIDE
Example 7

The same procedure is followed as in preceding examples, except that the raw material employed is 5-amino-2-hexyl-5-hydroxymethyl-1,3-dioxane.

AMIDE
Example 8

The same procedure is followed as in preceding examples, except that the raw material employed is 5-amino-2-(3-heptyl)-5-hydroxymethyl-1,3-dioxane.

AMIDE
Example 9

Oleic acid, olein or oleyl chloride is substituted for ricinoleic acid in Examples 1 to 8, preceding.

AMIDE
Example 10

Lauric acid, laurin or lauryl chloride is substituted for ricinoleic acid in Examples 1 to 8, preceding.

OXYALKYLATED 5-AMINO-1,3-DIOXANE
Example 1

1 pound mole of 2-propyl-5-hydroxy-methyl-5-amino-1,3-dioxane is oxyalkylated with 4 pound moles of ethylene oxide. The oxyethylation is conducted in a closed vessel in a stepwise manner. 1 pound mole of ethylene oxide is added to 1 pound mole of the aminodioxane. One-half of 1% of sodium methylate is added as a catalyst. The reaction takes place readily, particularly at temperatures moderately above the boiling point of water. For instance, 130° C. If the reaction does not take place readily at this temperature, one may employ a somewhat higher temperature, for instance, between 140–150° C. In any event, it is best to conduct the reaction in such a manner that there is no pressure, due to unreacted ethylene oxide, or other oxylating agent of more than 200 pounds. This may be accomplished by using less ethylene oxide, e. g., one-half pound mole for the first portion instead of one mole. 1 mole of ethylene oxide should be absorbed readily within 2-8 hours, when reaction is complete, as indicated by a drop in gauge pressure, due to the absorption of the ethylene oxide; a second portion of the reactant, for instance, another mole of ethylene oxide, is added and reacted in the same manner. The same procedure is employed so as to introduce the third mole of ethylene oxide. Three moles of ethylene oxide per mole of aminodioxane should be introduced without difficulty in not over 24 hours, and in many instances, can be introduced in one-third such time. Speed of reaction is dependent, in part, on effectiveness of stirring or agitation, insofar that the reaction may take place largely at interfacial surfaces.

OXYALKYLATED 5-AMINO-1,3-DIOXANE

Example 2

The seven other aminodioxanes specifically mentioned as reactants in "Amide, Examples 2-8" inclusive, are substituted for 2-propyl-5-hydroxymethyl-5-amino-1,3-dioxane in "Oxyalkylated 5-amino-1,3-dioxane, Example 1," preceding.

OXYALKYLATED 5-AMINO-1,3-DIOXANE

Example 3

The same procedure is followed as in Examples 1 and 2, immediately preceding, except that 8 moles of ethylene oxide are introduced per mole of aminodioxane instead of 4 moles.

OXYALKYLATED 5-AMINO-1,3-DIOXANE

Example 4

The same procedure is followed as in Examples 1 and 2, immediately preceding, except that 12 moles of ethylene oxide are introduced per mole of aminodioxane instead of 4 moles.

OXYALKYLATED 5-AMINO-1,3-DIOXANE

Example 5

The same procedure is employed as in Examples 1 to 4, immediately preceding, except that propylene oxide is substituted for ethylene oxide. Propylene oxide is less reactive than ethylene oxide, and it may be necessary to use a somewhat higher temperature of reaction and a somewhat longer period of reaction. Such increases in temperature and time of reaction, as compared with ethylene oxide, are only moderate. Even greater amounts of the alkylene oxide, for instance, 18-24 moles per mole of amine, may be used. In the case of a hydroxylated amine, 24-36 moles may be used.

Attention is directed to the fact that previous examples exemplifying amides or oxyalkylated aminodioxanes, represent intermediates. The remaining series of examples all represent new compositions of matter. They are conveniently divided into three classes, to wit: oxyalkylated amides, esters, and ester amides. These sub-divisions are preserved in the subsequent subject-matter for convenience.

OXYALKYLATED AMIDE

Example 1

1 pound mole of the amide derived from the selected aminodioxane, as described in "Amide, Example 1," preceding, is treated with an oxyalkylating agent in the same manner as employed for the oxyalkylation of amides derived from various primary amines, such as the amides of cyclohexylamine, benzylamine, aniline, and various alkylamines having 6-10 carbon atoms, such as octylamine. The oxyalkylation of high molal amides is well known and requires no elaboration. In general, the procedure which I prefer to employ is substantially that described in the oxyalkylation of the unamidified aminodioxanes in the preceding examples, except that the temperature of oxyalkylation in the initial stages must be sufficient to insure that the amide is a liquid, and particularly so when derived from high molal saturated acids such as stearic acid. From 6 to 12 moles of the alkylene oxide are used per mole of amide, as a minimum, and as many as 20 moles as a maximum. If a hydroxylated amide, derived from a hydroxylated amine is used, or in other instances, one may use 12 to 18 moles of the alkylene oxide per mole of amine. Even higher ratios may be employed, if desired.

The introduction of the oxyalkylene radical almost invariably yields a more fluid product, i. e., a product having a lower melting point. Thus, the temperature of reaction employed in oxyalkylation can be reduced after the initial reaction has taken place, i. e., after partial oxyalkylation.

There is no objection to employing an inert solvent during the early stages of oxyalkylation, although such solvent may cease to be a solvent after partial oxyalkylation takes place, and thus, would have to be removed as a matter of convenience, during the later stages of oxyalkylation. Such solvent, however, would serve its purpose, because when removed, the partially oxyalkylated mass should be substantially fluid. This is readily understandable by reference to an analogy where a solid such as lecithin is dissolved in xylene and subjected to oxyethylation. As oxyethylation proceeds, the product usually becomes xylene-insoluble. Under such circumstances, it is generally better to remove the xylene before proceeding with the further oxyethylation of the fluid derivative. Oxyalkylation of the aminodioxane can be conducted, as a rule, without a catalyst, if desired. It is preferable, however, to have a catalyst present in the oxyalkylation of an amide. One-half of one percent of sodium methylate or other alkali will serve. The oxyalkylation of an amide may take considerably longer and may take definitely high temperatures of reaction. As far as practical, it is better to employ the same temperature and pressures as described in connection with the oxyalkylation of the aminodioxanes, as previously described, except that the time of reaction may be doubled or tripled. If, however, the reaction does not go rapidly enough, under such circumstances, then increased temperatures short of a pyrolytic point may be used, but the preference, particularly when employing ethylene oxide, should not exceed 250-300 pounds. It is again pointed out that this entire procedure is the one that is used in the conventional oxyalkylation of amides, and may be varied to conform to such procedure.

OXYALKYLATED AMIDE

Example 2

The same procedure is employed as in the oxyalkylation of aminodioxane, except that as much as 18 to 24 moles of the alkylene oxide may be introduced per mole of amide.

Oxyalkylated Amide

Example 3

Instead of employing an amide of the kind exemplified by "Amide, Example 1," there is used instead amides exemplified by Examples 2 to 10, inclusive.

Ester

Example 1

1 pound mole of the oxyethylated aminodioxane described under "Oxyalkylated aminodioxane, Example 1," preceding, is esterified with 1 pound mole of ricinoleic acid or ethyl ricinoleate in the conventional manner. The procedure employed is the same as that employed for the esterification of triethanolamine, or particularly, triethanolamine, which has first been treated with several moles, for instance, 3–9 moles of ethylene oxide. Since the reaction is conducted in the absence of catalysts which usually are employed in esterification, such as benzene sulfonic acid, or the like, it is necessary to use a fairly high temperature, and generally speaking, one employs a temperature just short of the pyrolytic point. For instance, from 185° C. to just short of 200° C. Even a higher temperature, for instance, 240°–250° C., can be employed, provided there is no pyrolysis. If desired, the reaction can be hastened, and for that matter, conducted at a somewhat lower temperature by the use of an ester or amide as the acylating agent, and also by passage of a dried inert gas, such as nitrogen, through the reaction mass while subjected to constant agitation. The reaction is generally complete in 3–5 hours as a minimum period of time, and may take 12–18 hours, in some instances.

Ester

Example 2

Other oxyalkylated aminodioxanes, as described under the headings "Oxyalkylated aminodioxanes, Examples 2 to 5" are substituted for the particular oxyalkylated aminodioxane described in the preceding example.

Ester Amide

Example 1

1 pound mole of the oxyethylated amide obtained by oxyethylation of 1 pound mole of the amide derived by reaction between 1 pound mole of 5-amino-2-(3-amyl)-5-hydroxymethyl-1,3 dioxane and 1 pound mole of ricinoleic acid, followed by reaction with 6 pound moles of ethylene oxide, is reacted with 1 pound mole of oleyl chloride.

Ester Amide

Example 2

The same procedure is followed, except that lauryl chloride is substituted for oleyl chloride in Example 1, immediately preceding.

Ester Amide

Example 3

Ricinoleyl chloride is substituted for oleyl chloride.

Ester Amide

Example 4

The same procedure is followed as in the three examples immediately preceding, except that 5-amino-2-hexyl-5-hydroxymethyl-1,3-dioxane and 5-amino-2-(3-heptyl)-5-hydroxymethyl-1,3-dioxane are substituted for 5-amino-2-(3-amyl)-5-hydroxymethyl-1,3-dioxane.

The production of esters of higher fatty acids by the use of the acyl chloride as a reactant is well known and requires no description. The same procedure is followed, as, for example, in the reaction between glycerol and oleyl chloride. If desired, esterification in the preceding examples may be conducted by means of the acids instead of the acyl chlorides, and may also be conducted in the presence of a conventional esterification catalyst, such as sulfuric acid, benzene sulfonic acid, or any hydrochloric acid gas. Oxyalkylated amides of the kind described seem to esterify a little less readily than the usual alcohols. However, any conventional procedure can be employed, and particularly, one may employ the use of an inert solvent, such as xylene, in the manner previously mentioned in regard to amidification. The temperature of esterification is not determined by the presence of an inert solvent, such as xylene, and may vary between 120–180° C., or even higher. Time of esterification may vary from 3–30 hours. Procedure has already been indicated for hastening esterification reactions. See U. S. Patents Nos. 2,075,107, dated March 30, 1937, to Frazier, and 2,264,759, dated December 2, 1941, to Jones.

Incidentally, it is obvious that certain variants may be employed, without detracting from the general nature of the compounds herein described. For instance, the selected aminodioxane might be treated with a low molal carboxy acid having less than seven carbon atoms, such as acetic acid, hydroxyacetic acid, lactic acid, butyric acid, etc. The amide of the low molal acids so obtained could be subjected to oxyalkylation, and then subsequent to esterification, with a high molal carboxy acid in the manner described. Similarly, the aminodioxane, and especially the examples in which there is no hydroxymethyl group, could be subjected to the action of any conventional alkylating agent, such as an alkyl halide, benzyl chloride, methyl sulfate, or the like, so as to produce a secondary amine. Such secondary amine could be subjected to oxyalkylation in the manner, as previously described, and subsequently esterified with a high molal acid. Similarly, an amide derived from aminodioxane having a hydroxymethyl group might be subjected to treatment in the manner described in U. S. Patent No. 2,151,788, dated March 28, 1939, to Mauersberger.

In certain of the types of compounds previously described, there is no acyl radical directly attached to the amino nitrogen atom. Such products show basicity comparable to triethanolamine or esterified triethanolamine, or the esters of oxyethylated triethanolamine. Where such basicity exists, obviously the product can be used in the form of a salt, as well as in the form of the free base, or hydrate, i. e., combination with water. Salts of lactic acid, acetic acid, nitric acid, etc., are particularly valuable for various purposes hereinafter indicated.

As far as I am aware, the amides and oxyalkylated derivatives herein described, are useful not only as intermediates, as in the instant case, but also may be used as demulsifiers for water-in-oil emulsions, and as a break inducer in doctor treatment of the kind intended to sweeten sour gasoline. However, they are not nearly as effective for the purpose as the new compositions of matter herein claimed. Such simple compounds are not claimed as such, or for the uses indicated in the hereto attached claims.

Purely by way of illustration, although the previous descriptive matter has clearly indicated the nature of the reactants and compounds, the following formulas are included. All the various radicals indicated by R, R' and R² have their previous significance. The ethylene radical may be replaced by propylene, hydroxypropylene, butylene, etc.

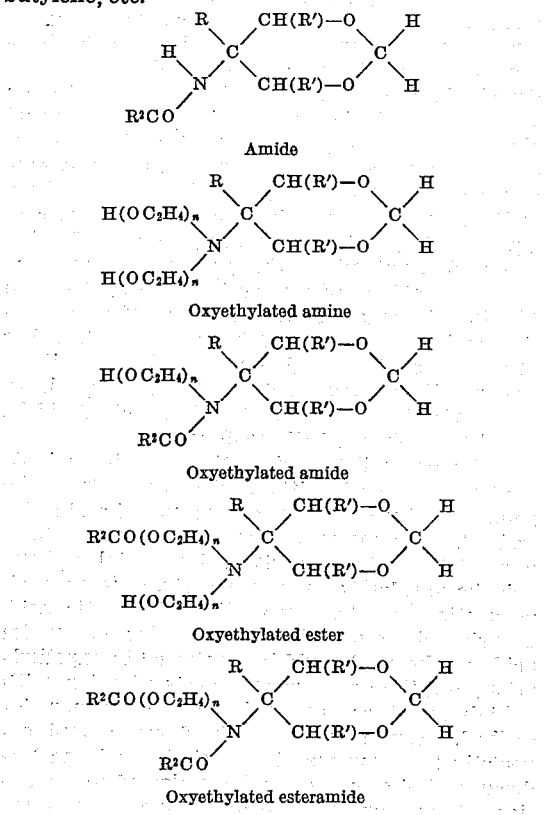

If the aminodioxane is hydroxylated, the derivative may be further complicated by the presence of three hydroxyethylene radicals, thus:

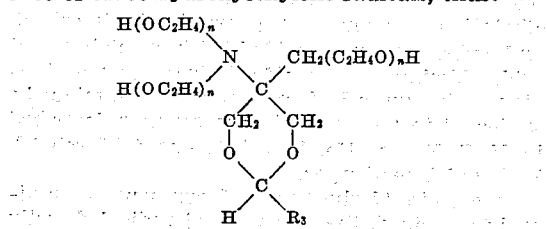

In all the above n varies from 3 to 12, or even 20.

Examples of polybasic carboxy acids or anhydrides suitable for use in the manufacture of the new demulsifier herein described, are maleic anhydride, maleic acid, fumaric acid, oxalic acid, succinic acid, phthalic acid, phthalic anhydride, citric acid, citraconic acid, etc. Other suitable polybasic carboxy acids may be prepared by the diene synthesis, which involves condensation of alpha-beta unsaturated acids, or anhydrides with compounds containing conjugated double bonds. For example, the condensation of maleic anhydride with alpha-terpinene yields a dicarboxy acid which is perfectly suitable for use in the manufacture of the demulsifiers contemplated herein. Other polycarboxy acids may be prepared similarly by the diene synthesis reaction involving the condensation of an alpha-beta unsaturated monocarboxy acid with a carboxy acid containing a conjugated double bond. For example, crotonic acid may be condensed with abietic acid, which contains a conjugated double bond, to yield a dicarboxy acid suitable for use in the manufacture of the demulsifiers contemplated herein. Another variant is the resultant obtained by reaction between maleic anhydride or the like, and an unsaturated material, particularly a fatty acid or glyceride, which does not contain a conjugated ethylene linkage. Such product may be monoethylenic, as in the case of oleic acid or olein, or may be polyethylenic, as in the case of linoleic acid or linolein. In the latter case, the double bonds are of the isolated type.

My preferred reagent is selected from one of the various types in which there is present a basic amino nitrogen atom. The expression "basic amino nitrogen atom" is used in its conventional sense.

"Unsaturated groups, or negative groups, if substituted for one more of the hydrogens on ammonia, reduce the basicity of the nitrogen atom to a remarkable degree. In general, the presence of one negative group linked on the nitrogen is sufficient to destroy the ordinary basic properties." (Textbook of Organic Chemistry, Richter, 2nd edition, page 253.)

Reference to an amine and amino compound is intended to include the salts and the anhydro base, as well as the hydrated base, since both obviously are present when a water-containing emulsion is treated with an amine or amino compound.

"In an aqueous solution of the amine the anhydro base, R—NH₂, the hydrated base, R—NH₃—OH, and the two ions are all present." Richter, v. s., page 252.

In the hereto appended claims reference to radicals derived from olefine oxides is intended to include glycid. In other words, in the case of propylene oxide, it is intended that hydroxy propylene oxide be included.

Materials of the kind herein contemplated are useful as wetting, detergent, and leveling agents in the laundry, textile, and dyeing industry; as wetting agents and detergents in the acid washing of fruit, in the acid washing or building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles such as sewage, coal washing waste water, and various trade wastes, and the like; as germicides, insecticides, emulsifiers for cosmetics, spray oils, water-repellent textile finish, etc., these uses are by no means exhaustive.

However, the most important phase of the present invention, as far as industrial application goes, is concerned with the use of the materials previously described, as demulsifiers for water-in-oil emulsions, and more specifically, emulsions of water or brine in crude petroleum.

I have found that the chemical compounds herein described, which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants, or wetting agents, in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote & Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote & Keiser.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials herein described.

I desire to point out that the superiority of the new demulsifier herein described is based upon its ability to treat certain emulsions more advantageously and at a somewhat lower cost than is possible with other available demulsifiers, or conventional mixtures thereof. It is believed that it will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

A somewhat analogous use of my new demulsifying agent, is the removal of a residual mud sheath which remains after drilling a well by the rotary method. Sometimes the drilling mud contains added calcium carbonate, or the like, to render the mud susceptible to reaction with hydrochloric acid or the like, and thus expedite its removal.

The new compounds herein described are of utility, not only for the purposes specifically enumerated in detail, but also find application in various other industries, processes, and for various uses where wetting agents of the conventional type are used. As to some of such additional uses which are well known, see "The Expanding Application of Wetting Agents," Chemical Industries, vol. 48, page 324 (1941).

Re-examination of the preceding data as to the structure and composition of the herein contemplated demulsifiers, indicates that the molecular weights may vary within the range from 431, in the case of the octenoic amide of 5-ethyl-5-amino-1,3-dioxane, which has been treated with 3 moles of ethylene oxide, to 5 or 10 times such values.

Having thus described my invention, what I claim as new and desire to secure by Letters Patent is:

1. A new composition of matter, comprising an acylated and oxyalkylated derivative of 5-amino-1,3-dioxanes; said amino-dioxanes having the structural formula:

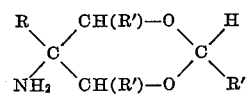

wherein R is a member of the class consisting of hydrogen, alkyl, and alpha-hydroxyalkyl, R' is a member of the class consisting of hydrogen, alkyl, and aryl; said acylated and oxyalkylated amino-dioxane derivatives being selected from the class consisting of oxyalkylated amides of the formula:

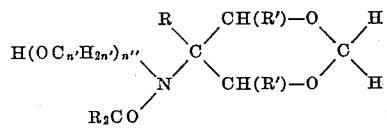

oxyethylated esters of the formula:

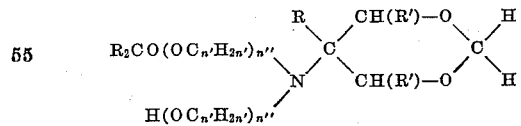

and oxyethylated esteramides of the formula:

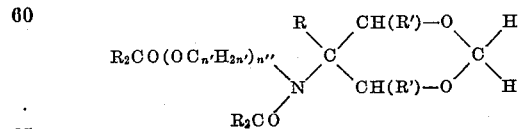

in which R and R' have their prior significance, and $R_2CO$ is the acyl radical of a detergent-forming monocarboxy acid having at least 8 and not more than 32 carbon atoms and $n'$ represents the numerals 2 to 10 and $n''$ represents the numerals 3 to 20.

2. The composition of matter described in claim 1, wherein RCO is a higher fatty acid acyl radical.

3. The composition of matter described in claim 1, wherein RCO is a higher fatty acid radical having 18 carbon atoms.

4. The composition of matter described in claim 1, wherein RCO is an unsaturated higher fatty acid acyl radical having 18 carbon atoms.

5. The composition of matter described in claim 1, wherein RCO is an unsaturated higher fatty acid acyl radical having 18 carbon atoms and wherein $n$ is at least 2 and not over 4.

6. The composition of matter described in claim 1, wherein RCO is an unsaturated higher fatty acid acyl radical having 18 carbon atoms and wherein $n$ is at least 2 and not over 4 and at least one occurrence of RCO being part of an amide radical.

7. The composition of matter described in claim 1, wherein RCO is an unsaturated higher fatty acid acyl radical having 18 carbon atoms and wherein $n$ is at least 2 and not over 4 and at least one occurrence of RCO being part of an ester radical.

8. The composition of matter described in claim 1, wherein RCO is an unsaturated higher fatty acid acyl radical having 18 carbon atoms and wherein $n$ is at least 2 and not over 4 and at least one occurrence of RCO being part of an ester radical and at least one occurrence of RCO being part of an amide radical.

9. In the method of manufacturing the new composition of matter described in claim 1, the step of oxyalkylating an aminodioxane, followed by the step of acylating said oxyalkylated aminodioxane.

MELVIN DE GROOTE.